United States Patent Office 3,340,020
Patented Sept. 5, 1967

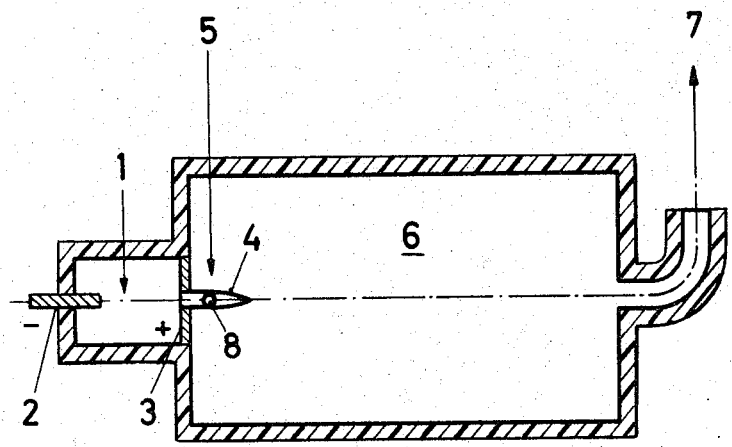

3,340,020
FINELY DISPERSED CARBIDES AND PROCESS FOR THEIR PRODUCTION
Ernst Neuenschwander, Basel, Klaus Schuett, Zollikerberg, Zurich, and Walter Scheller, Munchenstein, Basel-Land, Switzerland, assignors to Ciba Limited, Basel, Switzerland, a Swiss company
Filed Aug. 11, 1964, Ser. No. 388,832
Claims priority, application Switzerland, Aug. 13, 1963, 9,976/63; Aug. 29, 1963, 10,663/63
34 Claims. (Cl. 23—349)

In a gas discharge physics the term "plasma" describes a wholly or partially ionised gas. When the plasma as a whole possesses a directional velocity, it is described as a plasma flow or a plasma jet. Such a plasma jet can be produced, for example, by blowing a gas through an electric arc. This enables temperatures of 20,000° C. and over to be achieved. The velocity may range from a few metres per second to a multiple of the speed of sound.

It is known that chemical reactions can be carried out in a plasma jet. In this way thermal decompositions, reductions with carbon or hydrogen and halogenations have already been performed, and a number of nitrogen compounds have been formed: cf. inter alia "The Plasma Jet," Scientific American, 197, 1957, No. 2, pp. 80 et seq., and "Industrial and Engineering Chemistry," volume 55 [1963], pages 16 et seq.

It is also known that the gas jet may consist of an inert gas or a reactive gas. When, for example, argon is used, a plasma jet is obtained that acts only as a source of heat. When, on the other hand, nitrogen or oxygen is used, there is obtained not only a high-temperature gas but, under suitable conditions, a gas capable of bringing about chemical reactions. When a carbon or graphite anode is used, reactions with carbon can be carried out in the plasma jet.

The present invention provides a process for the manufacturer of finely dispersed non-pyrophoric carbides of metals or metalloids of the 3rd to the 6th group of the Periodic Table, wherein a halide of a metal or metalloid of the 3rd to 6th group of the Periodic Table and a hydro carbon are subjected to the action of a hydrogen plasma, the two starting materials being reacted in the gaseous state.

Suitable metals and metalloids are the elements concerned of the main and sub groups of the fore-mentioned groups, i.e. metals of the 3rd to the 6th group and metalloids of the 3rd and 4th group, and including the actinium series, which in this context are classed with the 3rd subgroup: cf. "Handbook of Chemistry and Physics," Ch. D. Hodgman, 1960, page 444. Preferably, the carbides of the elements titanium, zirconium, hafnium, vanadium, niobium, tantalum, molybdenum and tungsten and, from among the elements of the actinium series, those of thorium and uranium are produced. Suitable carbides of metalloids are especially those of elements boron and silicon.

Preferred use is made of metal halides that vaporize most easily and without decomposition. As a rule, they are the most highly halogenated metal halides. Preferred use is made of the chlorides, and among them $BCl_3$, $SiCl_4$, $TiCl_4$, $ZrCl_4$, $HfCl_4$, $VCl_4$, $NbCl_5$, $TaCl_5$, $MoCl_5$, $WCl_5$, $WCl_6$, $ThCl_4$ and $UCl_4$.

In the case of a metal or metalloid chloride and of methane, the preferably used hydrocarbon, the reactions are represented by the following equations:

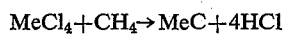
$$MeCl_4 + CH_4 \rightarrow MeC + 4HCl$$
or
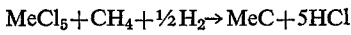
$$MeCl_5 + CH_4 + \tfrac{1}{2}H_2 \rightarrow MeC + 5HCl$$
or
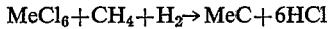
$$MeCl_6 + CH_4 + H_2 \rightarrow MeC + 6HCl$$
or in the case of $BCl_3$
$$4BCl_3 + CH_4 + 4H_2 \rightarrow B_4C + 12HCl$$

Instead of methane there may be used with equal success the following saturated or unsaturated hydrocarbons: propane, butane, hexane, acetylene, ethylene, propene-1, diacetylene, butadiene, benzene, xylene or naphthalene. As a rule, hydrocarbons containing 1 to 6 carbon atoms are used.

It is a specially significant feature of the present process that metal carbides of a very fine particle size are obtained. As a rule the average particle size ranges from $0.01\mu$ to $0.1\mu$, whereas in the previously known process, based on sintering metal oxides or the metals themselves with carbon, the average particle size achieved is over $1\mu$. The use of metal carbides having an average particle size below $1\mu$ is of special significance to metallurgical processes. The present process is further distinguished by high yields, which are generally better than 90%.

Compared with the previously known process for the manufacture of metal carbides from metal halides and hydrocarbons there is the essential difference that in the present case the carbide is formed in the gas phase and not from the gas phase, that is to say the reaction does not take place in a solid phase having a high temperature.

It is an especially valuable feature of the present process that the final products are non-pyrophoric metal carbides. This is certainly unexpected since metal or substances containing metals of an extremely small particle size are pyrophoric. Following the definition on page 495 of "Staub" 22 [1962], the term "pyrophority" is used here to describe the spontaneous auto-ignition occurring in the absence of an extraneous igniting agent, when a small amount of a solid powder makes contact with air at room temperature. Experiments have shown that the metal carbides produced by the present process are not pyrophoric, which is a considerable advantage in the handling and further processing of the carbides.

In a further step of the process the metal carbide obtained as a very fine, very voluminous powder is subsequently after-treated to reduce its volume and to free it from impurities; this after-treatment consists in first rotating the powder for several hours, whereby its bulk volume is reduced to about one tenth. The powder is then calcined under $10^{-1}$ to $10^{-4}$ mm. Hg pressure at a temperature at which the particles do not yet grow, preferably at 900° to 1000° C. If desired, the after-treatment may be performed without using a vacuum, but in the presence of hydrogen gas. The powder treated in this manner is unexpectedly still not pyrophoric, notwithstanding its large surface. Oxidation in air proceeds only slowly, and this facilitates the handling of the fine material.

Instead of for making unitary carbides the present process may also be used with special advantages for the manufacture of finely dispersed, non-pyrophoric mixed carbides, for example by feeding into the plasma jet a mixture of gaseous $TiCl_4$ and $TaCl_5$, or of $TaCl_5$ and $NbCl_5$.

In the performance of the present process it is advantageous to use for every 1 to 5, preferably 2 to 3, parts by volume or molecular proportions of the hydrocarbon 1 part by volume or 1 molecular proportion of the metal halide. The two components are injected into the plasma jet in the gaseous state, either together or separately. If desired, a carrier gas, such as argon or hydrogen, may be used. As a rule the procedure consists in heating the metal halide to a temperature at which the vapour pressure of the halide is ½ to 1 atmosphere (gauge), whereupon the gaseous hydrocarbon is conducted over the surface of the halide. The gas mixture thus formed is then injected into the plasma jet. When the gases are injected separately, it is of advantage to inject the hydrocarbon close to the anode exit and the halide at a small distance from it.

The reaction time and the temperature in the plasma jet depend on the chosen conditions and vary from $10^{-2}$ to $10^{-4}$ seconds and from 2000° to 5000° C.

The plasma jet is produced with the use of an electric high-amperage arc in a so-called plasma generator which is constructed on the known principle and comprises a water-cooled, hollow copper anode and a water-cooled tungsten cathode.

The figure is a diagrammatic representation of a plasma jet generator in side elevation, where 1 is the opening through which hydrogen is introduced (generally at right angles to the axis of the plasma jet) at a velocity variable within wide limits; 2 is the water-cooled cathode which is advantageously variable for its position; 3 is the cooled anode; 4 represents the plasma jet produced; at 5 the temperature ranges from 2000° to 5000° C.; 6 is the reaction chamber; 7 is the waste gas discharge duct, and 8 is the inlet for the gas mixture.

The gas mixture or the separate gases are advantageously injected into the plasma jet with the aid of a feed duct made from quartz. As a rule the carbide is formed in the plasma jet under atmospheric pressure, or if desired alternatively under a vacuum. The positions where the gas mixture or the separate gases are injected into the plasma jet must be decided in each case by suitable preliminary tests. The amounts of metal halide and hydrocarbon to be fed into the plasma jet per unit time depend on the size, temperature and velocity of the plasma jet and on the type and condition of the substances fed in. The expert can readily determine the optimum conditions by suitable tests. As a rule, the throughput of hydrogen is 10 to 100, preferably 15 to 40, litres (at standard temperature and under standard pressure) of hydrogen per minute, and during the same time 5 to 30, preferably 10 to 20, grams of the gas mixture consisting of metal halide and hydrocarbon are introduced. It is of advantage to use for every 100 mols of hydrogen 1 to 20, preferably 2 to 10, mols of metal halide.

*Example 1.—Manufacturing tantalum carbide*

The plasma generator is operated under the following conditions:

Current _____amperes__ 115
Total power _____kilowatts__ 11.5
Arc voltage _____volts__ 100
Flow rate of hydrogen, (standard) litres per minute _____ 25

The plasma jet has at the anode exit an average velocity of about 200 m./sec. and at the anode exit an average temperature of about 3300° C. At a distance of 1½ cm. from the anode a gaseous mixture of 10 g. of tantalum pentachloride and 1 g. of methane per minute is introduced into the flame. The reaction mixture forms a luminous jet 10 to 15 cm. long.

Yield: 5.1 g. of tantalum carbide per min., corresponding to 95% of the theoretical.

500 g. of the tantalum carbide collecting in the reaction chamber of the plasma burner are densified in a container on revolving rollers for 15 hours. The speed is 9000 revolutions per hour. The material is then calcined for 10 hours in a weak current of 10 litres of hydrogen per hour at 950° C. and then cooled.

Before the after-treatment, that is to say in the state it is obtained from the plasma flame, and after the after-treatment the product displays the following properties:

| Property | Method of determination | TaC from the plasma jet | TaC after the after-treatment |
|---|---|---|---|
| Pyrophority | 5 g at 25° C. spread on a plate of glass, in air. | Non-pyrophoric | Non-pyrophoric.* |
| Specific surface | Accdg. to the method of Brunnauer, Emmet and Teller (BET). | 40–60 m.²/g | 30–40 m.²/g. |
| Average particle size | Calculated from the specific surface assuming globular particles. | 0.01μ | 0.010. |
|  | Electron microscopy (electron-optical magnification 20,000:1, total 40,000:1). | 0.01–0.03μ | 0.01–0.030 (considerably agglomerated). |
| Bulk weight | Measured accdg. to DIN 53 468 | 0.15–0.25 g./cc | 1.5–2.5 g./cc. |
| X-ray diagram | Guinier camera, CuK$_d$ irradiation | Only TaC | Only TaC. |

*Over a 24-hour period the weight increases thus:

| After (hours) | ¼ | ½ | 1 | 2 | 6 | 24 |
|---|---|---|---|---|---|---|
| By (percent by weight) | 0.4 | 0.5 | 0.7 | 0.9 | 1.0 | 1.3 |

This experiment proves that oxidation proceeds only slowly.

*Example 2*

For the manufacture of tantalum carbide from tantalum pentachloride and acetylene, propylene or benzene the conditions described in Example 1 are used, except that the hydrocarbons are introduced separately from tantalum pentachloride. Per minute 10 g. each of tantalum pentachloride are introduced and reacted in the flame with 0.8 g. of acetylene or 0.8 g. of propylene or 0.6 g. of benzene. Acetylene and propylene are injected in the form of the pure gas, whereas benzene is injected with the aid of argon as carrier gas. In each of the three cases tantalum carbide is obtained in the same yield and with the same properties as described in Example 1.

*Example 3.—Manufacturing NbC, TiC, VC, $W_2C$, $B_4C$, SiC, HfC and ZrC*

To manufacture the above-named carbides the plasma generator is operated under the same conditions as in Example 1. The carbides thus obtained are after-treated as described for tantalum carbide in Example 1. The products shown in Table I are obtained.

TABLE I.—INDIVIDUAL CARBIDES

| No. | Me-chloride in g./min. | CH₄ in g./min. | Yield in g./min. | Yield in percent | Pyrophority | Specific surface in m.²/g. (BET) | Average particle size, μ | Bulk weight in g./cm.³ | X-ray diagram |
|---|---|---|---|---|---|---|---|---|---|
| 1 | NbCl₅ | 8 | 1 | 2.9 | 94 | Non-pyrophoric | 60–80 | 0.01 | 0.8–1.3 | NbC |
| 2 | TiCl₄ | 6 | 1 | 1.7 | 90 | ....do.... | 90–120 | 0.01 | 0.5–0.9 | TiC |
| 3 | VCl₄ | 6 | 1 | 1.8 | 92 | ....do.... | 80–100 | 0.01 | 0.6–1.0 | VC |
| 4 | WCl₆ | 7 | 0.3 | 3.1 | 93 | ....do.... | 15–25 | 0.02 | 1.5–3.0 | α-W₂C |
| 5 | BCl₃ | 5 | 0.3 | 0.53 | 90 | ....do.... | 100–120 | 0.02 | 0.2–0.5 | B₄C |
| 6 | SiCl₄ | 8 | 0.9 | 1.7 | 90 | ....do.... | 80–100 | 0.02 | 0.2–0.5 | α-SiC |
| 7 | HfCl₄ | 2 | 0.2 | 1.1 | 92 | ....do.... | 30–40 | 0.01 | 1.2–2.5 | HfC |
| 8 | ZrCl₄ | 1.5 | 0.2 | 0.61 | 92 | ....do.... | 60–80 | 0.01 | 0.7–1.5 | ZrC |

*Example 4.—Manufacturing the mixed carbides TiC/TaC, TiC/VC and TaC/W₂C*

The plasma jet is produced as described in Example 1.

The introduced gas mixture consists of TiCl₄ and TaCl₅ in the molecular ratio of 2:1, and of twice a molecular excess of methane.

The after-treatment follows the directions in Example 1. There is obtained a non-pyrophoric mixed carbide TiC/TaC whose lattice constant $a_0$ is 4.375 A. and thus corresponds to the molecular ratio of 2TiC:1TaC. The average particle size of the mixed carbide, calculated from the specific surface (70 to 90 m.²/g.) measured by the BET method is 0.01μ. The bulk weight is 1.0 to 1.5 g. per cc.

The mixed carbides shown in Table II are produced by the same process.

TABLE II.—MIXED CARBIDES

| No. | Me-chloride in g./min. | Molecular ratio of the metals | CH₄ in g./min. | Yield in g./min. | Yield in percent | Pyrophority | Specific surface in m.²/g. (BET) | Average particle size in μ | Bulk weight in g./cm.³ | X-ray diagram lattice constant in A. |
|---|---|---|---|---|---|---|---|---|---|---|
| 9 | TiCl₄ 2.7 / VCl₄ 2.7 | 1:2 | 0.6 | 1.6 | 92 | Non-pyrophoric | 90–110 | 0.01 | 0.6–1.0 | NaCl-type. $a_0$=4.23. [1] |
| 10 | TaCl₅ 5.0 / WCl₆ 5.0 | 1:0.9 | 0.7 | 4.8 | 94 | ....do.... | 25–40 | 0.01 | 1.5–3.0 | NaCl-type. $a_0$=4.35. [2] |

[1] According to J.T. Norton and A.L. Mowry, J. Metals 1 (1949) page 133 the lattice constant for a TiC/VC mixed carbide at equimolecular ratio is 4.25₅ A.
[2] Pseudobinary system TaC/W₂C: the lattice constant obtained has not yet been mentioned in the literature.

What is claimed is:

1. A process for the production of finely dispersed carbides having non-pyrophoric properties and being composed of elements selected from the group consisting of metals of the 3rd to the 6th group of the Periodic Table and metalloids of the 3rd and 4th group of the Periodic Table, in which process (1) at least one halide of an element selected from the group consisting of a metal of the 3rd to the 6th group of the Periodic Table and a metalloid of the 3rd and 4th group of the Periodic Table, and (2) a hydrocarbon are subjected to the action of a hydrogen plasma, the two starting materials (1) and (2) being reacted in the gaseous state.

2. A process for the production of finely dispersed carbides having non-pyrophoric properties and being composed of elements selected from the group consisting of metals of the 3rd to the 6th group of the Periodic Table and metalloids of the 3rd and 4th group of the Periodic Table, in which process (1) at least one halide of an element selected from the group consisting of a metal of the 3rd to the 6th group of the Periodic Table and a metalloid of the 3rd and 4th group of the Periodic Table, and (2) a hydrocarbon are subjected to the action of a hydrogen plasma, the two starting materials (1) and (2) being reacted in the gaseous state, in which process the resulting pulverulent carbides are densified by being rotated, then calcined in the presence of hydrogen at a temperature ranging from 900 to 1000° C. and then cooled.

3. A process for the production of finely dispersed carbides having non-pyrophoric properties and being composed of elements selected from the group consisting of metals of the 3rd to the 6th group of the Periodic Table and metalloids of the 3rd and 4th group of the Periodic Table, in which process (1) at least one chloride of an element selected from the group consisting of a metal of the 3rd to the 6th group of the Periodic Table and a metalloid of the 3rd and 4th group of the Periodic Table, and (2) a hydrocarbon are subjected to the action of a hydrogen plasma, the two starting materials (1) and (2) being reacted in the gaseous state.

4. A process for the production of finely dispersed carbides having non-pyrophoric properties and being composed of elements selected from the group consisting of metals of the 3rd to the 6th group of the Periodic Table and metalloids of the 3rd and 4th group of the Periodic Table, in which process (1) at least one chloride of an element selected from the group consisting of a metal of the 3rd to the 6th group of the Periodic Table and a metalloid of the 3rd and 4th group of the Periodic Table, and (2) a hydrocarbon selected from the group consisting of saturated hydrocarbons containing 1 to 6 carbon atoms and unsaturated hydrocarbons containing 1 to 6 carbon atoms, are subjected to the action of a hydrogen plasma, the two starting materials (1) and (2) being reacted in the gaseous state.

5. A process for the production of finely dispersed mixed carbides having non-pyrophoric properties and being composed of elements selected from the group consisting of metals of the 3rd to the 6th group of the Periodic Table and metalloids of the 3rd and 4th group of the Periodic Table, in which process (1) at least two halides of elements selected from the group consisting of a metal of the 3rd to the 6th group of the Periodic Table and a metalloid of the 3rd and 4th group of the Periodic Table, and (2) a hydrocarbon are subjected to the action of a hydrogen plasma, the starting materials (1) and (2) being reacted in the gaseous state.

6. A process for the production of finely dispersed carbides having non-pyrophoric properties and being composed of elements selected from the group consisting of metals of the 3rd to the 6th group of the Periodic Table and metalloids of the 3rd and 4th group of the Periodic Table, in which process (1) at least one chloride of an element selected from the group consisting of a metal of the 3rd to the 6th group of the Periodic Table and a metalloid of the 3rd and 4th group of the Periodic Table, and (2) a hydrocarbon selected from the group consisting of saturated hydrocarbons containing 1 to 6 carbon atoms and unsaturated hydrocarbons containing 1 to 6 carbon atoms, are subjected to the action of a hydrogen plasma, the two starting materials (1) and (2) being reacted in the gaseous state, in which process the resulting pulverulent carbides are densified by being rotated, then calcined in the presence of hydrogen at a temperature ranging from 900 to 1000° C. and then cooled.

7. A process for the production of finely dispersed mixed carbides having non-pyrophoric properties and being composed of elements selected from the group consisting of metals of the 3rd to the 6th group of the Periodic Table and metalloids of the 3rd and 4th group of the Periodic Table, in which process (1) at least two chlorides of elements selected from the group consisting of a metal of the 3rd to the 6th group of the Periodic Table and a metalloid of the 3rd and 4th group of the Periodic Table, and (2) a hydrocarbon selected from the group consisting of saturated hydrocarbons containing 1 to 6 carbon atoms and unsaturated hydrocarbons containing 1 to 6 carbon atoms, are subjected to the action of a hydrogen plasma, the starting materials (1) and (2) being reacted in the gaseous state, in which process the resulting pulverulent carbides are densified by being rotated, then calcined in the presence of hydrogen at a temperature ranging from 900 to 1000° C. and then cooled.

8. A process for the production of finely dispersed boron carbide having non-pyrophoric properties, wherein boron trichloride and a hydrocarbon selected from the group consisting of saturated hydrocarbons containing 1 to 6 carbon atoms and unsaturated hydrocarbons containing 1 to 6 carbon atoms, are subjected to the action of a hydrogen plasma, the two starting materials being reacted in the gaseous state.

9. A process for the production of finely dispersed silicon carbide having non-pyrophoric properties, wherein silicon tetrachloride and a hydrocarbon selected from the group consisting of saturated hydrocarbons containing 1 to 6 carbon atoms and unsaturated hydrocarbons containing 1 to 6 carbon atoms, are subjected to the action of a hydrogen plasma, the two starting materials being reacted in the gaseous state.

10. A process for the production of finely dispersed titanium carbide having non-pyrophoric properties, wherein titanium tetrachloride and a hydrocarbon selected from the group consisting of saturated hydrocarbons containing 1 to 6 carbon atoms and unsaturated hydrocarbons containing 1 to 6 carbon atoms, are subjected to the action of a hydrogen plasma, the two starting materials being reacted in the gaseous state.

11. A process for the production of finely dispersed zirconium carbide having non-pyrophoric properties, wherein zirconium tetrachloride and a hydrocarbon selected from the group consisting of saturated hydrocarbons containing 1 to 6 carbon atoms and unsaturated hydrocarbons containing 1 to 6 carbon atoms, are subjected to the action of a hydrogen plasma, the two starting materials being reacted in the gaseous state.

12. A process for the production of finely dispersed hafnium carbide having non-pyrophoric properties, wherein hafnium tetrachloride and a hydrocarbon selected from the group consisting of saturated hydrocarbons containing 1 to 6 carbon atoms and unsaturated hydrocarbons containing 1 to 6 carbon atoms, are subjected to the action of a hydrogen plasma, the two starting materials being reacted in the gaseous state.

13. A process for the production of finely dispersed vanadium carbide having non-pyrophoric properties, wherein vanadium tetrachloride and a hydrocarbon selected from the group consisting of saturated hydrocarbons containing 1 to 6 carbon atoms and unsaturated hydrocarbons containing 1 to 6 carbon atoms, are subjected to the action of a hydrogen plasma, the two starting materials being reacted in the gaseous state.

14. A process for the production of finely dispersed niobium carbide having non-pyrophoric properties, wherein niobium pentachloride and a hydrocarbon selected from the group consisting of saturated hydrocarbons containing 1 to 6 carbon atoms and unsaturated hydrocarbons containing 1 to 6 carbon atoms, are subjected to the action of a hydrogen plasma, the two starting materials being reacted in the gaseous state.

15. A process for the production of finely dispersed tantalum carbide having non-pyrophoric properties, wherein tantalum pentachloride and a hydrocarbon selected from the group consisting of saturated hydrocarbons containing 1 to 6 carbon atoms and unsaturated hydrocarbons containing 1 to 6 carbon atoms, are subjected to the action of a hydrogen plasma, the two starting materials being reacted in the gaseous state.

16. A process for the production of finely dispersed molybdenum carbide having non-pyrophoric properties, wherein molybdenum pentachloride and a hydrocarbon selected from the group consisting of saturated hydrocarbons containing 1 to 6 carbon atoms and unsaturated hydrocarbons containing 1 to 6 carbon atoms, are subjected to the action of a hydrogen plasma, the two starting materials being reacted in the gaseous state.

17. A process for the production of finely dispersed tungsten carbide having non-pyrophoric properties, wherein tungsten hexachloride and a hydrocarbon selected from the group consisting of saturated hydrocarbons containing 1 to 6 carbon atoms and unsaturated hydrocarbons containing 1 to 6 carbon atoms, are subjected to the action of a hydrogen plasma, the two starting materials being reacted in the gaseous state.

18. A process for the production of finely dispersed thorium carbide having non-pyrophoric properties, wherein thorium tetrachloride and a hydrocarbon selected from the group consisting of saturated hydrocarbons containing 1 to 6 carbon atoms and unsaturated hydrocarbons containing 1 to 6 carbon atoms, are subjected to the action of a hydrogen plasma, the two starting materials being reacted in the gaseous state.

19. A process for the production of finely dispersed uranium carbide having non-pyrophoric properties, wherein uranium tetrachloride and a hydrocarbon selected from the group consisting of saturated hydrocarbons containing 1 to 6 carbon atoms and unsaturated hydrocarbons containing 1 to 6 carbon atoms, are subjected to the action of a hydrogen plasma, the two starting materials being reacted in the gaseous state.

20. A process for the production of a finely dispersed mixed carbide of titanium and tantalum having non-pyrophoric properties, wherein a mixture of titanium tetrachloride and tantalum pentachloride, and a hydrocarbon selected from the group consisting of saturated hydrocarbons containing 1 to 6 carbon atoms and unsaturated hydrocarbons containing 1 to 6 carbon atoms, are subjected to the action of a hydrogen plasma, the starting materials being reacted in the gaseous state.

21. A process for the production of a finely dispersed mixed carbide of titanium and vanadium having non-pyrophoric properties, in which process a mixture of titanium tetrachloride and vanadium tetrachloride, and a hydrocarbon selected from the group consisting of saturated hydrocarbons containing 1 to 6 carbon atoms and unsaturated hydrocarbons containing 1 to 6 carbon atoms, are subjected to the action of a hydrogen plasma, the starting materials being reacted in the gaseous state.

22. A process for the production of finely dispersed mixed carbide of tantalum and tungsten having non-pyrophoric properties, wherein a mixture of tantalum pentachloride and tungsten hexachloride, and a hydrocarbon selected from the group consisting of saturated hydrocarbons containing 1 to 6 carbon atoms and unsaturated hydrocarbons containing 1 to 6 carbon atoms, are subjected to the action of a hydrogen plasma, the starting materials being reacted in the gaseous state.

23. A pulverulent non-pyrophoric tantalum carbide, having an average particle size of $0.01\mu$, a specific surface of 30 to 40 m.$^2$/g. and a bulk weight of 1.5 to 2.5 g./cc.

24. A pulverulent non-pyrophoric niobium carbide, having an average particle size of $0.01\mu$, a specific surface of 60 to 80 m.$^2$/g. and a bulk weight of 0.8 to 1.3 g./cc.

25. A pulverulent non-pyrophoric titanium carbide, having an average particle size of $0.01\mu$, a specific surface of 90 to 120 m.$^2$/g. and a bulk weight of 0.5 to 0.9 g./cc.

26. A pulverulent non-pyrophoric vanadium carbide, having an average particle size of $0.01\mu$, a specific surface of 80 to 100 m.$^3$/g. and a bulk weight of 0.6 to 1.0 g./cc.

27. A pulverulent non-pyrophoric tungsten carbide, having an average particle size of $0.02\mu$, a specific surface of 15 to 25 m.$^2$/g. and a bulk weight of 1.5 to 3.0 g./cc.

28. A pulverulent non-pyrophoric boron carbide, having an average particle size of $0.02\mu$, a specific surface of 100 to 120 m.$^2$/g. and a bulk weight of 0.2 to 0.5 g./cc.

29. A pulverulent non-pyrophoric silicon carbide, having an average particle size of $0.02\mu$, a specific surface of 80 to 100 m.$^2$/g. and a bulk weight of 0.2 to 0.5 g./cc.

30. A pulverulent non-pyrophoric hafnium carbide, having an average particle size of $0.01\mu$, specific surface of 30 to 40 m.$^2$/g. and a bulk weight of 1.2 to 2.5 g./cc.

31. A pulverulent non-pyrophoric zirconium carbide, having an average particle size of $0.01\mu$, a specific surface of 60 to 80 m.$^2$/g. and a bulk weight of 0.7 to 1.5 g./cc.

32. A pulverulent non-pyrophoric mixed carbide of TiC and TaC, wherein the ratio of the constituents is 2TiC to 1TaC, having an average particle size of $0.01\mu$, a specific surface of 70 to 90 m.$^2$/g. and a bulk weight of 1.0 to 1.5 g./cc.

33. A pulverulent non-pyrophoric mixed carbide of TiC and VC, wherein the ratio of the constituents is 1TiC to 1VC, having an average particle size of $0.01\mu$, a specific surface of 90 to 110 m.$^2$/g. and a bulk weight of 0.6 to 1.0 g./cc.

34. A pulverulent non-pyrophoric mixed carbide of TaC and $W_2C$, wherein the ratio of the constituents is 1TaC to 0.45 $W_2C$, having an average particle size of $0.01\mu$, a specific surface of 25 to 40 m.$^2$/g. and a bulk weight of 1.5 to 3.0 g./cc.

References Cited

UNITED STATES PATENTS 3,005,762  10/1961  Fenn _____ 204—164
3,070,420  12/1962  White et al. _____ 23—14.5

OTHER REFERENCES

Helton: A Preliminary Study on Uranium Carbide Synthesis, Using a Plasma Jet; AEC Document ORNL-TM-872, May 25, 1964, pp. 4, 11, 13 and 19.

Schwarzkopf et al.: Refractory Hard Metals, 1953, New York, The MacMillan Company, p. 47.

BENJAMIN R. PADGETT, *Primary Examiner.*

L. DEWAYNE RUTLEDGE, *Examiner.*

S. TRAUB, R. L. GRUDZIECKI, *Assistant Examiners.*